May 31, 1966 W. F. WOLFNER 3,254,287

TAPE HANDLING MECHANISM WITH DYNAMIC BRAKING

Filed Sept. 17, 1962 3 Sheets-Sheet 1

INVENTOR.
WILLIAM F. WOLFNER
BY
Curtis Morris & Safford
ATTORNEYS

TAPE HANDLING MECHANISM WITH DYNAMIC BRAKING

Filed Sept. 17, 1962 3 Sheets-Sheet 2

INVENTOR.
WILLIAM F. WOLFNER

Curtis, Morris & Safford
ATTORNEYS.

INVENTOR
WILLIAM F. WOLFNER
BY
Curtis, Morris & Safford.
ATTORNEYS.

United States Patent Office 3,254,287

Patented May 31, 1966

3,254,287
TAPE HANDLING MECHANISM WITH DYNAMIC BRAKING

William F. Wolfner, Trumbull, Conn., assignor to Dictaphone Corporation, Bridgeport, Conn.

Filed Sept. 17, 1962, Ser. No. 223,876
8 Claims. (Cl. 318—212)

Figure 1:
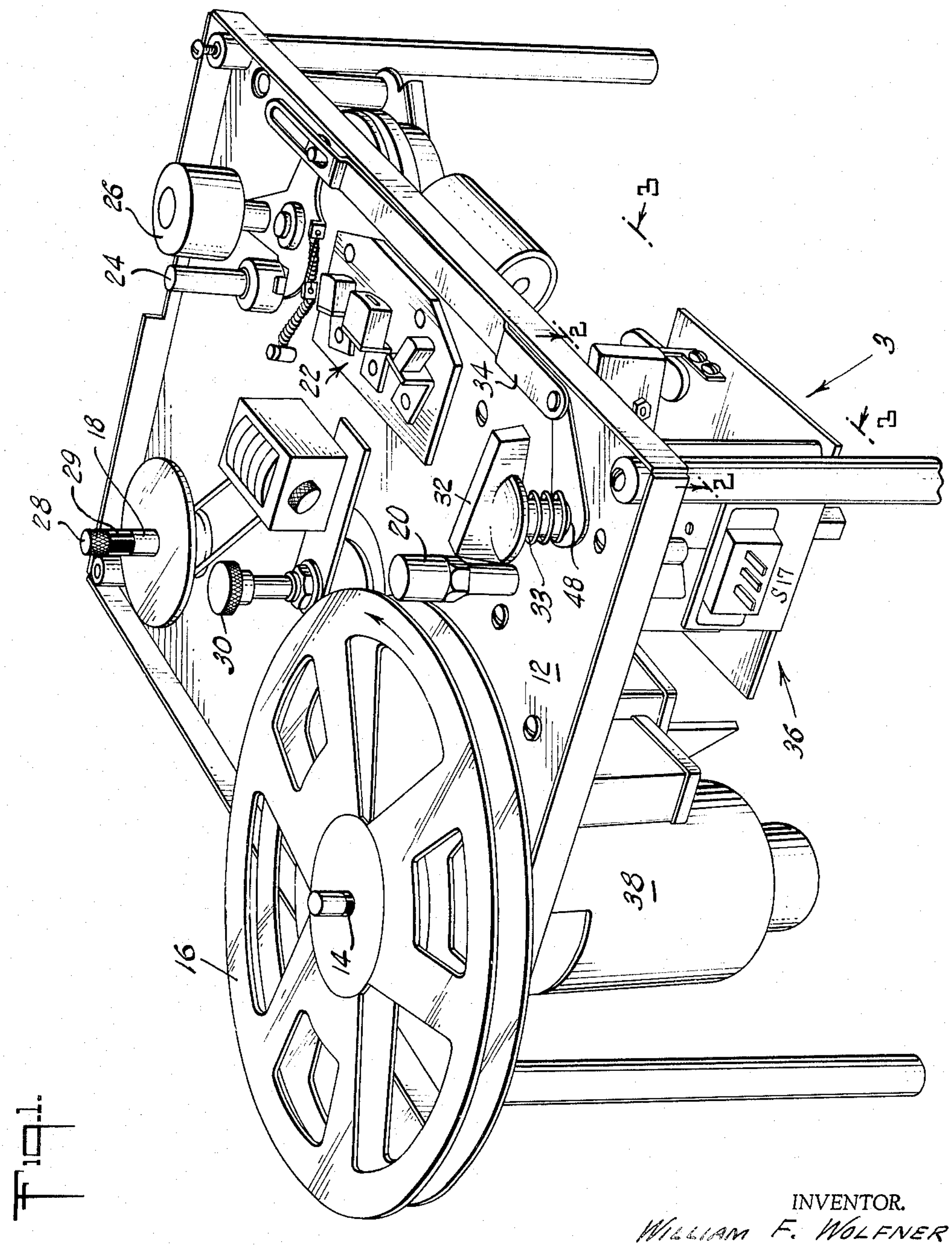

This invention relates to an improved mechanism for handling magnetic tape during recording or playback.

An object of the invention is to provide a more effective and reliable arrangement for winding and unwinding a reel of magnetic tape during recording or playback.

Another object is to provide a very high quality tape handling mechanism which is relatively inexpensive to manufacture.

A further object is to provide a mechanism of this kind having improved and simplified operating controls.

These and other objects will in part be understood from and in part pointed out in the following description.

The general type of tape deck mechanism to which the present invention relates as two spindles on which are placed, respectively, a reel onto which the tape can be wound, and a supply reel holding a quantity of tape, for example 1800 feet. The tape is stretched between the two reels being passed over erase, recording and reproducing heads and between a capstan and drive roller which pull the tape at constant speed (e.g. 7½ inches per second). The tape when pulled along by the capstan and drive roller, unwinds from the supply reel and winds upon the takeup reel, the latter being driven in forward direction by a suitable drive arrangement which rotates the reel at the speed permitted by the tape in being wound upon it. The supply reel is similarly driven in opposite sense by a retarding or braking force which serves to keep the tape taut while unwinding.

In the past the drive arrangements for the respective reel spindles have either been too expensive for popular use, or else though reasonable in cost not sufficiently reliable and effective. This is particularly true where friction clutches were used as the spindle driving means. Clutches of this kind tend to run unevenly, which causes wow and flutter in the recorded signal on the tape, and more importantly, they quickly wear out. The present invention, in one of its aspects, solves this difficulty.

A tape handling mechanism must be able to run not only in normal forward speed but also in high speed forward and reverse in order to rewind the tape or to wind it ahead quickly. It is thus necessary to be able to shift the mechanism easily into any of these drive speeds. Previously, this has always been a problem—either separate motors had to be used, or else complicated arrangements of links and levers were resorted to, usually with the penalty of much greater chance of malfunction or failure. The present invention in another of its aspects provides an improved solution to this problem.

In accordance with the present invention, in one specific embodiment thereof, the two reel spindles of a tape deck are each fitted with a special drive motor having split windings. These motors, during normal tape drive, are energized equally and oppositely at substantially reduced power. They thereby keep the tape stretched between them under moderate and substantially constant tension. Thus, the capstan and drive roller are able to pull the tape from one reel to the other exceptionally smoothly and easily. To shift the mechanism into either high speed forward or reverse, the drive roller is disengaged from the tape and one or the other spindle motors is fully energized to drive it at its rated speed, the other motor being completely de-energized and hence free wheeling.

The manually operated control knob by which the machine is switched into its various drive conditions is arranged as follows. In its "at rest" position the knob occupies the upper of two vertically spaced levels and the center of three horizontal positions. The center position is "Stop," the left is "Normal Forward" and the right is high speed "Reverse."

There are also three positions for the knob on the lower level which are reached by pushing the knob down and then turning it either right or left. The lower level positions are: center, "Stop," left, "Fast Forward," and right, high speed "Reverse." These knob positions are analogous to a letter "H" in which the upper level positions are along the left leg of the H, the lower ones along the right leg, and the up and down movement of the knob is along the cross bar of the H. Thus it is seen that in going from one drive condition to another (e.g. from normal forward to reverse), it is necessary in every instance to go through a stop position. In this way we insure that the reels and spindles are brought essentially to a stopped condition before being driven in another direction or at a different speed. Thus, spilling or breaking of the tape is avoided.

Now, whenever the control knob is returned to a Stop position, electrodynamic braking forces are applied to the spindle motors to bring the reels and tape quickly to a stop without either undue strain or loss of tension on the tape. This is accomplished by applying a direct current to a first phase of one motor (which is on the "unwinding" spindle), and to a different phase of the other motor (on the "winding" spindle), thereby giving a somewhat greater braking force to the first motor than to the second. The small difference in braking forces results in a carefully controlled amount of tension on the tape. The stopping time of the tape reels and tape from any drive condition is of the order of a second.

Since either spindle motor may be the "unwinding" one in returning to stop, it is necessary to apply the braking currents selectively in accordance with whether the machine is being stopped from a forward or a reverse drive condition. This is accomplished by means of a memory switch which is actuated in one direction when the machine is set into forward drive and actuated in the other direction when the machine is set into reverse drive, this switch remaining in its immediately previous state when the machine is stopped. Thus, the braking direct current is selectively switched into the windings of the spindle motors depending upon whether the machine is being stopped from a forward or a reverse drive condition.

Figure 2:
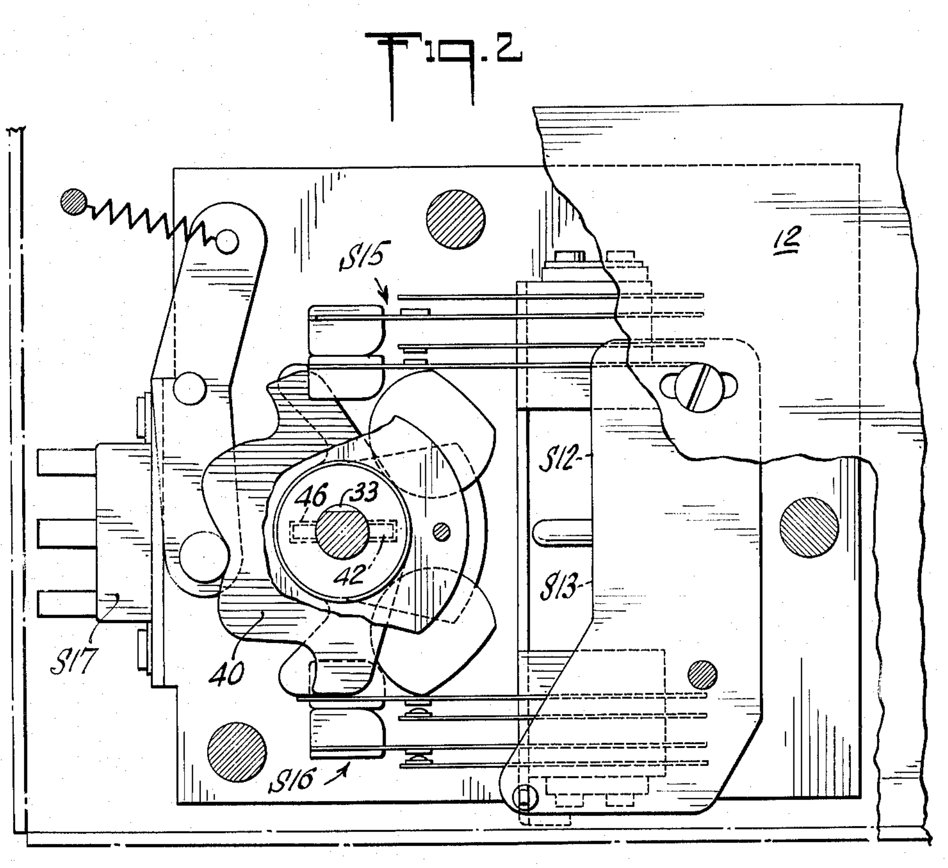
Figure 3:
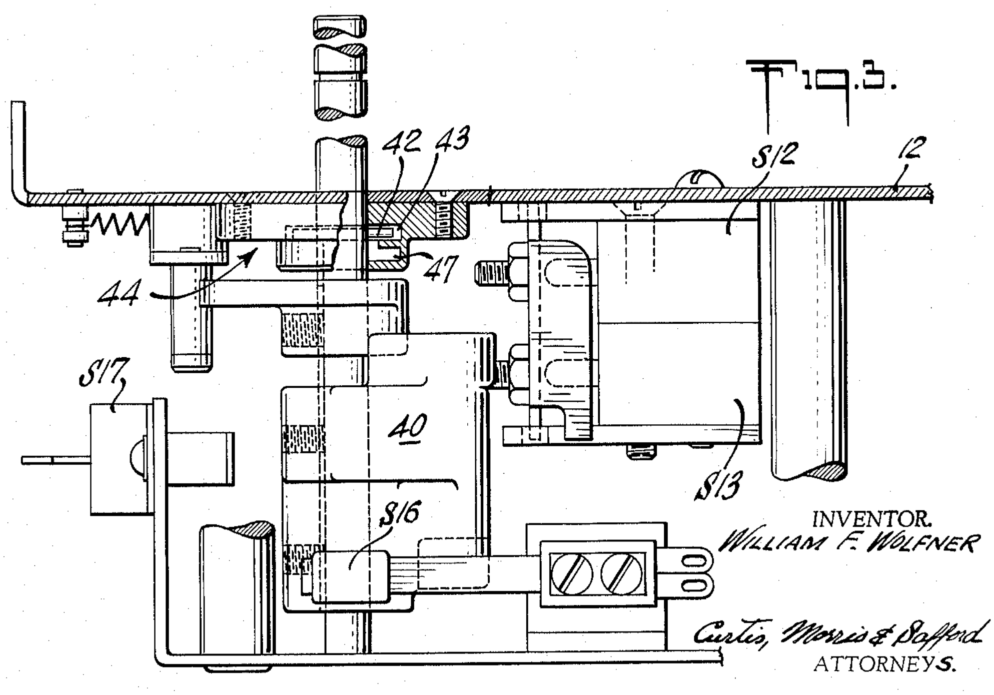
Figure 4:
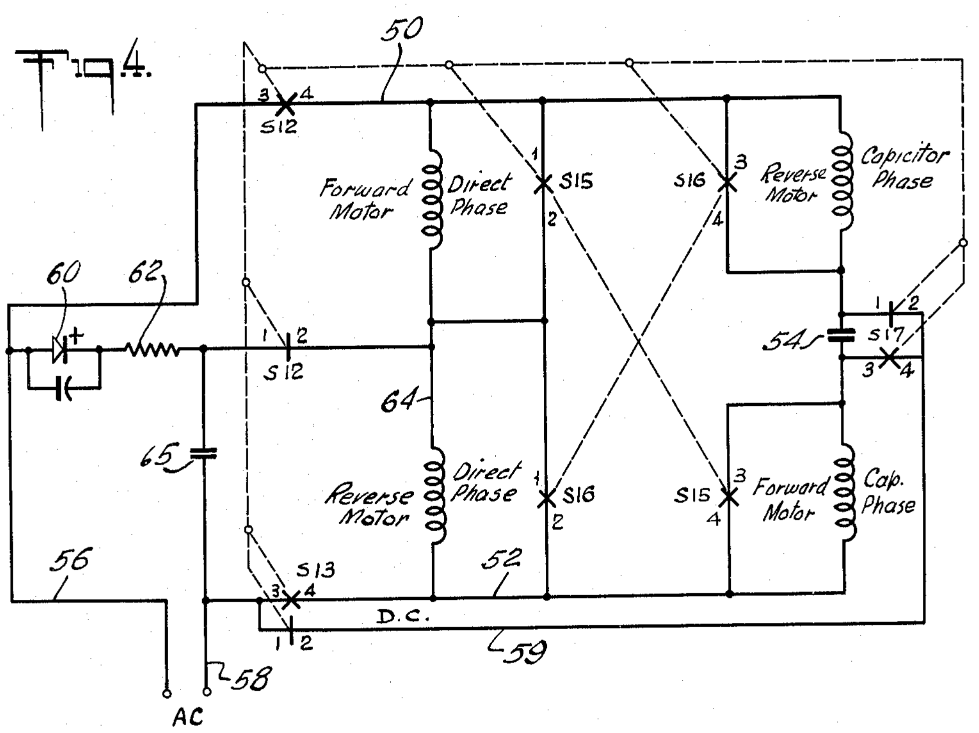
Figure 5:
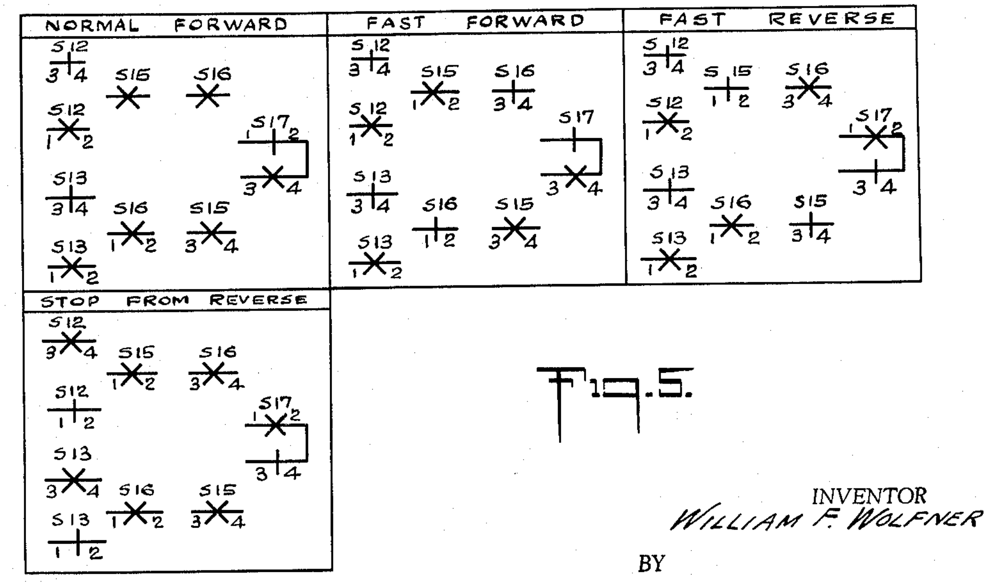

A better understanding of the invention together with a fuller appreciation of its many advantages will best be gained from the following description of the accompanying drawings wherein:

FIGURE 1 is a perspective view of a tape recorder mechanism embodying the invention, FIGURE 2 is an enlarged section view taken as indicated by lines 2—2 in FIGURE 1 and showing the switch assembly which is actuated by the control knob of the machine, FIGURE 3 is a side view of the assembly taken as indicated by lines 3—3 in FIGURE 1, FIGURE 4 is a schematic diagram of the spindle motor windings and the switches actuated by the control knob, and FIGURE 5 is a diagram of the positions of the contacts of the switches shown in FIGURE 4 for the various drive conditions indicated.

The tape deck mechanism 10 shown in FIGURE 1 includes a base or frame 12 upon which the various parts of the mechanism are mounted. The housing for this mechanism has been omitted for the sake of clearer illustration.

Near the left rear corner of the frame is positioned a first or supply spindle 14 on which can be fitted a tape reel 16, as indicated. Near the other rear corner is a second or takeup spindle 18, which also can hold a tape reel (not shown).

The tape on the supply reel is adapted to be threaded over a guide post 20, past an erase, record and playback head assembly 22, between a capstan 24 and a drive puck or roller 26, and onto the takeup reel. This mechanism can be mounted horizontally or vertically and to this end the top of each spindle has a special reel clamp. This, as shown best on spindle 18, comprises a knurled screw 28 threaded into the top of the spindle. Between this screw and the top of the spindle is a thick rubber washer 29 which, when the screw is dogged down, expands and prevents the tape reel from being slipped over it. Thus in this simple and highly effective way the reels are held down on their respective spindles. Of course, when screw 28 is backed off, washer 29 contracts and the reel can easily be slipped off or on.

At about the center of base 12 is a knob 30 by which a motor (not shown) for driving capstan 24 is turned on or off. Near the left front corner of the base is a manual control knob 32 by which the mechanism is set into the various drive conditions. This control knob is mounted on a vertical shaft 33 and through a linkage 34 pinches puck 26 against capstan 24. It also controls a switch assembly generally indicated at 36, which will be described in greater detail shortly. Reel spindle 14 is an extension on the upper end of the rotor shaft of a motor 38, which can be substantially the same as the motor described and claimed in U.S. Patent No. 2,993,131. A similar motor drives spindle 18. These motors each have a direct phase winding and a capacitor phase winding. These windings and their modes of connection will be described in greater detail in connection with FIGURE 4.

As seen in FIGURES 2 and 3 switch assembly includes a molded nylon cam 40 mounted on shaft 33. When shaft 33 is rotated in either direction from the position shown (Stop) ganged switches S12 and S13, whose contacts are shown in FIGURES 4 and 5, are actuated. When control knob is in either its upper or lower level and is rotated clockwise about 45° into fast Reverse, the contacts of switch S16 are closed. In all other positions of the control knob they are open. Also, when cam 40 is rotated clockwise the memory switch S17 is actuated into a first of its two positions. On the other hand, when shaft 33 is in its lower position and is rotated counter-clockwise, the contacts of switch S15 will be closed; in all other positions of the control knob they are open. Whenever shaft 33 is rotated counter-clockwise from the position shown, switch S17 is actuated to the second of its two positions. This switch is an ordinary slide switch and engages cam 40 through a lost motion connection.

As seen in FIGURE 3, shaft 33 just beneath frame 12 carries a cross-pin 42 which can engage in an upper circular opening 43, corresponding to the left leg of the H, hidden inside a bushing 44. A vertical slot 46 (see FIG. 2), corresponding to the cross bar of the H, permits knob 32 to be pushed down when pin 42 is aligned with the slot. This slot extends down to a lower circular opening 47, corresponding to the right leg of the H, in the bushing. Pin 42 can enter the slot 46 only when control knob 32 is in a Stop position. The control knob is urged to the upper level by a spring 48 (see FIG. 1).

FIGURE 4 is a diagram of the electrical circuit connections for the spindle drive motors. The motor associated with takeup spindle 18, which for convenience is here designated the "forward" motor, has a direct phase and a capacitor phase of about twice as many turns. Similarly, the motor associated with supply spindle 14, here designated the "reverse" motor, has a direct phase and a capacitor phase, the direct phase being connected in series with the direct phase of the forward motor across voltage leads 50 and 52. The capacitor phases are likewise connected across these leads in series with a capacitor 54.

Shunting the direct phase of the forward motor are contacts 1 and 2 of switch S15, and shunting the corresponding phase of the reverse motor are contacts 1 and 2 of switch S16. In complementary fashion contacts 3 and 4 of switch S15 shunt the capacitor phase of the forward motor, and contacts 3 and 4 of switch S16 shunt the capacitor phase of the reverse motor.

Lead 50 is connected through contacts 3 and 4 of switch S12 to one side 56 of the A.C. power input terminals. Lead 52 is connected to the other side 58 of these terminals through contacts 3 and 4 of switch S13.

Assuming A.C. voltage is applied to leads 50 and 52, when the contacts of switches S15 and S16 are open, the direct and capacitor phases, respectively, of the spindle motors are in series and accordingly they are energized with reduced power. Thus they apply a carefully controlled tension to the tape stretched between the supply and takeup tape reels. On the other hand, when the contacts of either switch S15 or S16 are closed, one or the other of the spindle motors will be energized at full power, the other motor being shorted out and hence not energized at all. This circuit arrangement is thus simple and inexpensive, yet highly efficient. If additional drag on the "unwinding" motor is desired, small value resistors can be connected in series with shorting switches S15 and S16.

Braking current is applied selectively to the windings of the spindle motors as follows. Branching from lead 56 is rectifier 60 which connects via a limiting resistor 62 to the common connection 64 between the direct phases of the forward and reverse motors. A capacitor 65 smooths out ripple or hum in the direct voltage from the rectifier. Branching from the return side 58 of the A.C. line via contacts 1 and 2 of switch S13 is a lead 59. The other end of the lead through either contacts 1 and 2 or 3 and 4 of memory switch S17 connects to one or the other of the capacitor phases of the forward and reverse motors.

Now, as shown in FIGURE 4, the contacts of switch S12, of switch S13, of switch S15, of switch S16, and of switch S17 are ganged. The respective positions of the switch contacts, with an "X" indicating open, and a vertical line (|) indicating closed, is shown in FIGURE 4. Here, the contacts of memory switch S17 are shown in the position occupied by them after the control knob has been returned to stop from either Fast Forward or Normal Forward drive condition. The respective positions of the contacts for other states of the control knob are given in FIGURE 5.

It will now be appreciated that mechanism 10 is designed so that it is rugged and highly reliable in operation. It will maintain its optimum operating efficiency indefinitely since there is essentially no wear in the driving or braking of the spindles. In particular, the electric circuit arrangement of FIGURE 4 is simple yet highly effective and efficient in its operation.

The above description is intended in illustration and not in limitation of the invention. Various changes in the embodiments described may occur to those skilled in the art and these can be made without departing from the spirit or scope of the invention as set forth.

I claim:

1. In a tape handling mechanism of the character described, a pair of tape reel spindles, a pair of motors, each motor being connected to drive a respective spindle, each motor having a main phase winding and an auxiliary phase winding, first switch means to connect said windings respectively in series across a power line, second switch means to connect one or the other of said motors across the power line and at least partially to deenergize the remaining motor, and third means including a switch to apply selectively to the main winding of one motor and to the auxiliary winding of the other motor a direct current to provide electrodynamic braking.

2. The arrangement in claim 1 wherein said switch means and switch are operated in proper sequence by a manually operable control knob and cam.

3. The arrangement in claim 1 wherein said third means includes a memory switch which applies to whichever is the unwinding motor a greater electrodynamic braking force than is applied to the other motor.

4. A circuit for controlling the braking and driving of the tape spindles in a tape recorder, comprising first and second main windings and third and fourth auxiliary windings of two spindle motors, said main windings being connected in series and said auxiliary windings being connected in series, first switch means to connect the respective windings in series across a power line for normal forward operation, second switch means to connect the main and auxiliary windings of one motor across the power line and to disconnect the windings of the other motor therefrom, during high speed drive condition and third switch means to selectively apply to the main winding of one motor and the auxiliary winding of the other motor direct current to give electrodynamic braking when returning to stop from any drive condition.

5. The circuit in claim 4 wherein said third switch means includes a memory switch which is actuated into one or the other of two positions when the circuit is set into forward or reverse drive, said memory switch remaining in its immediately previous condition when the circuit is set into stop.

6. The circuit in claim 4 wherein said auxiliary windings are connected in series with a phase shifting capacitor.

7. A tape handling mechanism and control circuit comprising a pair of tape spindles adapted to be driven in opposite directions, a respective motor for each spindle, each motor having a main winding and an auxiliary winding, the main windings of said motors being connected in series across a pair of leads, the auxiliary windings of said motors being connected in series across said leads, a first set of switch contacts to at least partially short-circuit the windings of one or the other of said motors to drive said spindles in one direction or the other at high speed, and means including a source of direct current and a second set of switch contacts to apply to the main winding of one motor and the auxiliary winding of the other motor a direct current to give electrodynamic braking when said mechanism is returned to stop after any drive condition.

8. The arrangement in claim 7 wherein said auxiliary windings are connected together through a phase shifting capacitor.

References Cited by the Examiner

UNITED STATES PATENTS

| | | | |
|---|---|---|---|
| 2,854,613 | 9/1958 | Mowery | 318—212 |
| 2,858,494 | 10/1958 | Choudhury | 318—212 |
| 2,938,677 | 5/1960 | Flan et al. | 318—212 X |
| 2,992,788 | 7/1961 | Hardison | 242—68.3 |
| 3,035,788 | 5/1962 | Horberg | 242—68.3 |
| 3,117,262 | 1/1964 | Mullen | 318—7 |
| 3,141,626 | 7/1964 | Hoskin | 242—55.12 X |

FOREIGN PATENTS

| | | |
|---|---|---|
| 817,572 | 8/1959 | Great Britain. |

ORIS L. RADER, *Primary Examiner.*

LEONARD D. CHRISTIAN, *Examiner.*

JACK C. BERENZWEIG, *Assistant Examiner.*